United States Patent
Adamson et al.

(10) Patent No.: US 6,167,977 B1
(45) Date of Patent: Jan. 2, 2001

(54) EASY-INSTALL, TWO-POSITION TRACTOR HOOD

(75) Inventors: William H. Adamson, Lake Villa; Jesse J. Bahr, Clarendon Hills; Salvatore LoPiccolo, Addison, all of IL (US)

(73) Assignee: Case Corporation, Racine, WI (US)

( * ) Notice: Under 35 U.S.C. 154(b), the term of this patent shall be extended for 0 days.

(21) Appl. No.: 09/232,771

(22) Filed: Jan. 15, 1999

(51) Int. Cl.$^7$ .............................. B62D 25/12; B62D 25/10
(52) U.S. Cl. ..................... 180/69.2; 180/69.24; 16/289; 16/361; 16/358; 16/357; 403/83
(58) Field of Search .......................... 180/69.2, 69.21, 180/69.24; 292/DIG. 14; 16/289, 357, 358, 361; 403/83, 52, 85, 81, 321, 322.1

(56) References Cited

U.S. PATENT DOCUMENTS

| | | |
|---|---|---|
| 1,598,868 | 9/1926 | Lundelius . |
| 2,135,613 * | 11/1938 | Orlow .................................. 180/69.2 |
| 2,246,792 * | 6/1941 | Dall ..................................... 180/69.2 |
| 3,556,240 * | 1/1971 | Hartman .............................. 180/69.2 |
| 4,382,482 | 5/1983 | Brandl et al. . |
| 4,572,312 | 2/1986 | France et al. . |
| 4,630,698 * | 12/1986 | Siewert et al. ..................... 180/69.21 |
| 5,004,062 | 4/1991 | Foot . |
| 5,465,803 * | 11/1995 | Kircher et al. ....................... 180/69.2 |
| 5,538,097 | 7/1996 | Stauffer et al. . |
| 5,564,514 | 10/1996 | Knight . |
| 5,570,925 | 11/1996 | Chen . |
| 5,634,525 | 6/1997 | Templeton et al. . |
| 5,738,179 * | 4/1998 | Matsui ............................... 180/69.21 |
| 5,890,556 * | 4/1999 | Shearn et al. ...................... 180/69.21 |

OTHER PUBLICATIONS

Westlaw Database—EP 792787 based on a Priority App.—US 608114 Feb. 28, 1996.

\* cited by examiner

Primary Examiner—Michael Mar
Assistant Examiner—Hau Phan
(74) Attorney, Agent, or Firm—Foley & Lardner

(57) ABSTRACT

A work vehicle having a novel hood coupling apparatus is disclosed. The work vehicle includes a frame provided with a compartment and a hood. The hood is coupled to the frame by at least one hinge and at least one latch. The latch includes a stationary portion associated with the frame and a movable portion associated with the hood, and the hinge includes a first portion associated with the frame and a second portion associated with the hood. The latch is configured for the stationary portion to engage the movable portion in a particular location when the hood is closed, and the second portion of the hinge is configured to assume an approximate position with respect to the first portion of the hinge, and thereby to the frame, upon engagement of the latch, the latch thereby aligning the hood and the second portion of the hinge to the frame when engaged. The work vehicle may also include a hood biasing device and a hood positioner for controlling the amount of opening of the hood. The hood positioner includes a cam and a cam follower. Also disclosed is an apparatus for the securing of a hood to a work vehicle. The apparatus includes at least one latch, the latch including a stationary portion associated with the frame and a movable portion associated with the hood, the stationary portion configured to engage the movable portion in a particular location when the hood is closed. The apparatus also includes at least one hinge including a first portion associated with the frame and a second portion associated with the hood, the second portion of the hinge configured to assume an approximate position with respect to the first portion of the hinge, and thereby to the frame, upon engagement of the latch, the latch thereby aligning the hood and the second portion of the hinge to the frame when engaged.

22 Claims, 5 Drawing Sheets

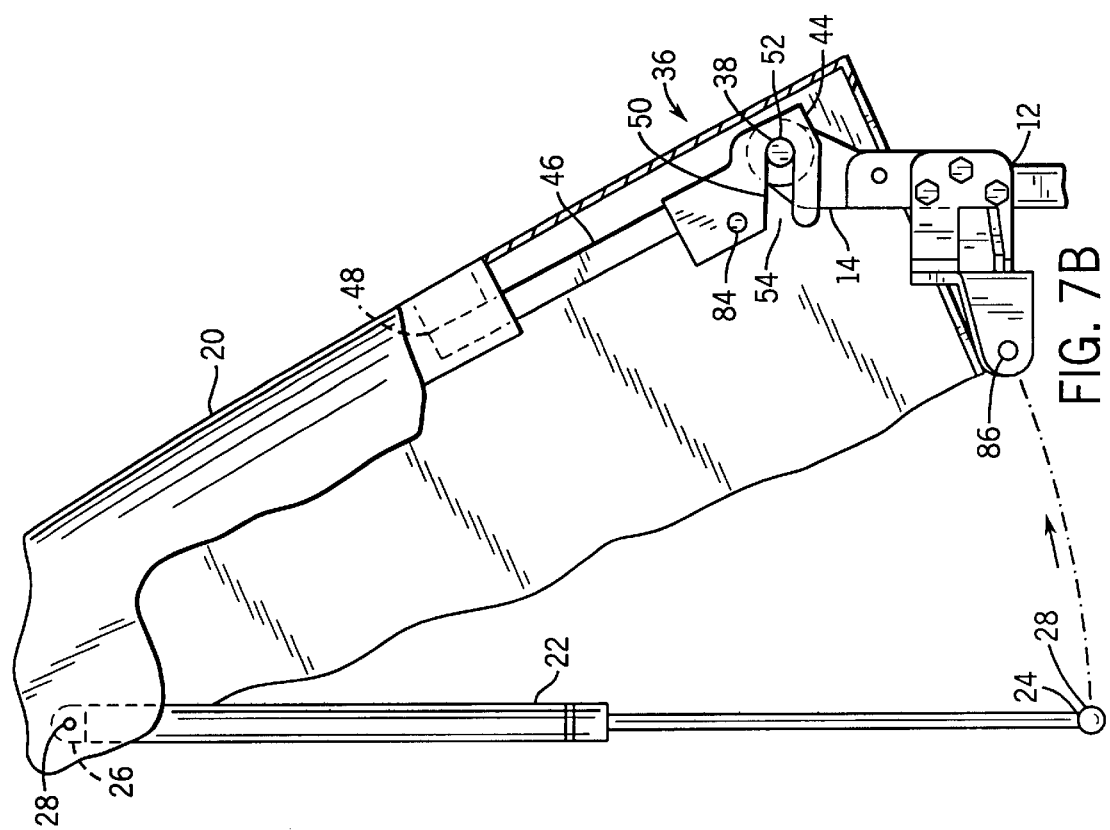
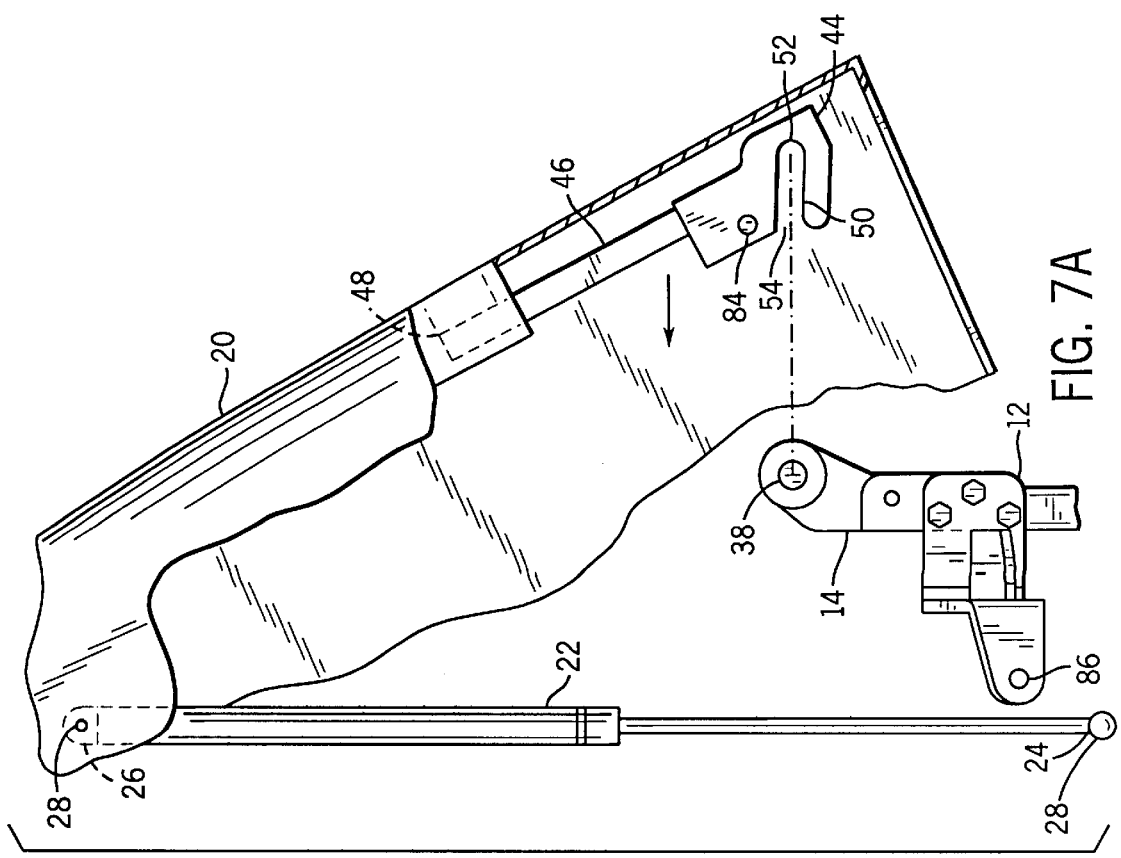

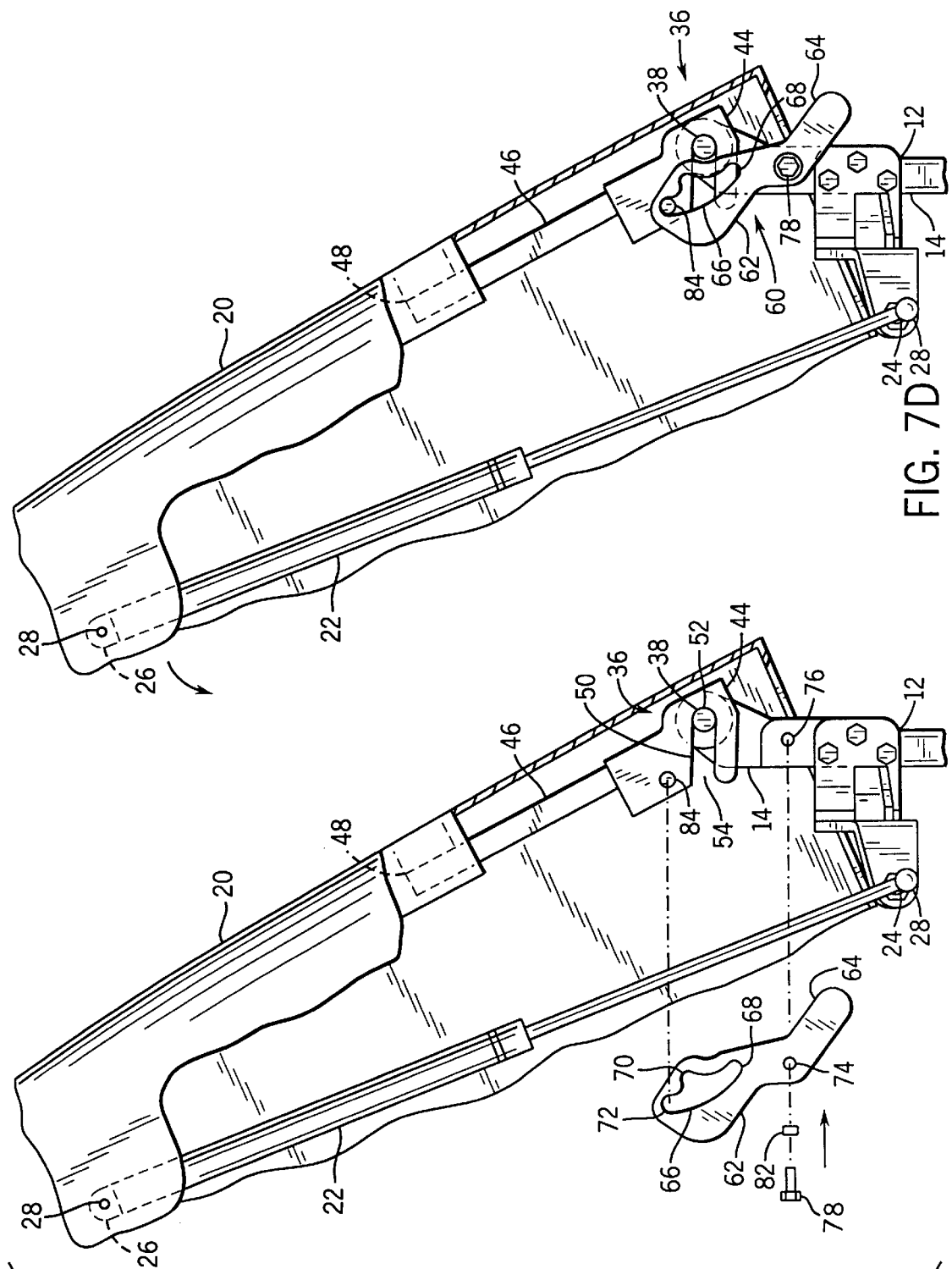

EASY-INSTALL, TWO-POSITION TRACTOR HOOD

FIELD OF THE INVENTION

The present invention relates to work vehicles, such as agricultural tractors and construction equipment, having a compartment containing, e.g., an engine, machinery, or tools. It relates particularly to such vehicles having openable hoods for covering such compartments when in a closed position.

BACKGROUND OF THE INVENTION

Work vehicles, including agricultural tractors and construction equipment, are provided with compartments such as engine compartments. Such a compartment is often at least partially covered by, e.g., a hood, for protection from dust, debris, weather, theft, etc. Engine compartments may also be covered to contain noise and to route cooling air flow. Such compartments are generally kept covered by hoods in normal use of the vehicle and in storage, but must be opened to provide access for periodic maintenance and inspection and for repairs.

Hoods are often mounted to work vehicles with one or more hinges and at least one latch. The hinges generally include a stationary leaf affixed to the work vehicle structure, or frame, and a pivotally movable leaf affixed to the hood. The hinges and latch coact in the work vehicle manufacturing assembly process in that they must all be located in proper positions with respect to each other and to the hood (i.e., aligned) for proper functioning of the hinges and latch. Due in part to buildups of manufacturing dimensional tolerances, alignment of hinges and latch during assembly of a work vehicle can be arduous and time consuming. Similar difficulties may also be encountered when reinstalling a hood to a work vehicle after completion of a service operation (e.g., engine replacement or overhaul) requiring removal of the hood from the work vehicle.

In general, engine compartment hoods of work vehicles such as tractors used in agriculture and construction need be raised only partially (e.g., 40° from the horizontal) in order to perform routine, daily tasks such as inspecting and cleaning radiators and oil coolers, inspecting fluid levels and belt tensions, looking for fluid leaks, etc. Such hoods are large and relatively heavy and, although balanced by gas springs and the like, can require significant reach and effort to close after having been fully opened to a relatively large angle (e.g., 65° from the horizontal). It is therefore sometimes desirable for a hood to have more than one position of opening; e.g., a first position of a lesser degree of opening sufficient for routine daily inspection and maintenance, and a second position of a greater degree of opening for more extensive work requiring a greater degree of access.

It would be advantageous to provide for the hood of a work vehicle to be installable to the vehicle without necessity of aligning of hinges and one or more latches, irrespective of normal and typical manufacturing dimensional tolerances.

It would also be advantageous to provide for the hood of a work vehicle to be openable to a first, partially opened position providing sufficient access for performing of typical daily maintenance and inspection tasks, while also providing for the hood to be further openable to a second, fully opened position for tasks which need to be performed less frequently but require a greater degree of access.

SUMMARY OF THE INVENTION

The present invention relates to a work vehicle including a frame provided with a compartment, and a hood for at least partially covering the compartment when disposed in a closed position, wherein the hood is coupled to the frame by at least one hinge and at least one latch when in the closed position. The latch includes a stationary portion associated with the frame and a movable portion associated with the hood, and the hinge includes a first portion associated with the frame and a second portion associated with the hood. The latch is configured for the stationary portion to engage the movable portion in a particular and predetermined location with respect to the frame when the hood is disposed in the closed position, and the second portion of the hinge is configured to assume an approximate position with respect to the first portion of the hinge, and thereby to the frame, upon engagement of the latch, the latch thereby aligning the hood and the second portion of the hinge to the frame when engaged.

Another aspect of the invention pertains to a work vehicle including a frame provided with a compartment, and a hood for at least partially covering the compartment and having a closed position and at least one opened position. The hood has a hood pivot, the hood pivot including a hood pivot major axis about which the hood is pivoted for opening and closing of the hood, the hood pivot further including a stationary portion associated with the frame and a movable portion associated with the hood. The work vehicle further includes a biasing device having a first end coupled to the frame and a second end coupled to the hood, the biasing device configured and disposed to exert a moment upon the hood about the major axis of the hood pivot substantially equal in magnitude and opposite in direction to a moment imposed about the major axis of the hood pivot by the weight of the hood, the hood being thereby repositionable with respect to the frame by a worker irrespective of the weight of the hood. The work vehicle further includes a hood positioner for controlling the amount of opening of the hood, the hood positioner including a cam pivotally mounted to one of the frame and the hood by a cam pivot disposed adjacent the hood pivot, the cam pivot including a major axis which is parallel to the major axis of the hood pivot, a first end of the cam surface including a first stop for a cam follower and corresponding to the closed position of the hood, a second end of the cam surface including a second stop for the cam follower and corresponding to the at least one opened position of the hood. The work vehicle further includes a cam follower affixed to the other of the frame and the hood, configured and disposed to engage the cam surface, and a biasing means for maintaining engagement of the cam follower with the cam surface.

Another aspect of the invention pertains to an apparatus for the securing of a hood to a work vehicle, the hood disposable in closed and at least one opened positions with respect to a frame of the work vehicle, the hood coupled to the frame and configured for at least partially covering a compartment of the work vehicle when disposed in a closed position. The apparatus includes at least one latch, the latch including a stationary portion associated with the frame and a movable portion associated with the hood, the latch configured for the stationary portion to engage the movable portion in a particular and predetermined location with respect to the frame when the hood is disposed in the closed position. The apparatus also includes at least one hinge including a first portion associated with the frame and a second portion associated with the hood, the second portion of the hinge configured to assume an approximate position with respect to the first portion of the hinge, and thereby to the frame, upon engagement of the latch, the latch thereby aligning the hood and the second portion of the hinge to the frame when engaged.

Another aspect of the invention pertains to an apparatus for positioning of a hood with respect to a frame of a work vehicle, the work vehicle having a compartment, the hood configured and disposed for at least partially covering the compartment and having a closed position and at least one opened position. The apparatus includes a hood pivot, the hood pivot including a hood pivot major axis about which the hood is pivoted for opening and closing of the hood, the hood pivot further including a stationary portion associated with the frame and a movable portion associated with the hood. The apparatus also includes a biasing device having a first end coupled to the frame and a second end coupled to the hood, the biasing device configured and disposed to exert a moment upon the hood about the major axis of the hood pivot substantially equal in magnitude and opposite in direction to a moment imposed about the major axis of the hood pivot by the weight of the hood. The hood being in a substantially balanced condition, the hood is easily repositionable with respect to the frame by a worker irrespective of the weight of the hood. The apparatus further includes a hood positioner for controlling the amount of opening of the hood, the hood positioner including a cam pivotally mounted to one of the frame and the hood by a cam pivot disposed adjacent the hood pivot, the cam pivot including a major axis which is parallel to the major axis of the hood pivot. A first end of the cam surface includes a first stop for a cam follower and corresponds to the closed position of the hood, a second end of the cam surface includes a second stop for the cam follower and corresponds to the at least one opened position of the hood. The apparatus further includes a cam follower affixed to the other of the frame and the hood, configured and disposed to engage the cam surface, and a biasing means for maintaining engagement of the cam follower with the cam surface.

DESCRIPTION OF THE DRAWINGS

A full understanding of the invention may be gained from the Drawings taken in conjunction with the Detailed Description below, wherein like reference numerals refer to like parts.

FIG. 7A is a fragmentary left-side sectional elevation of a hood assembly prior to installation to a frame.

FIG. 7B is a fragmentary left-side sectional elevation of the hood assembly partially installed to the frame.

FIG. 7C is a fragmentary left-side sectional elevation of the hood assembly more nearly fully installed to the frame.

FIG. 7D is a fragmentary left-side sectional elevation of the hood assembly fully installed to the frame.

DETAILED DESCRIPTION OF EXEMPLARY EMBODIMENTS

Figure 1:
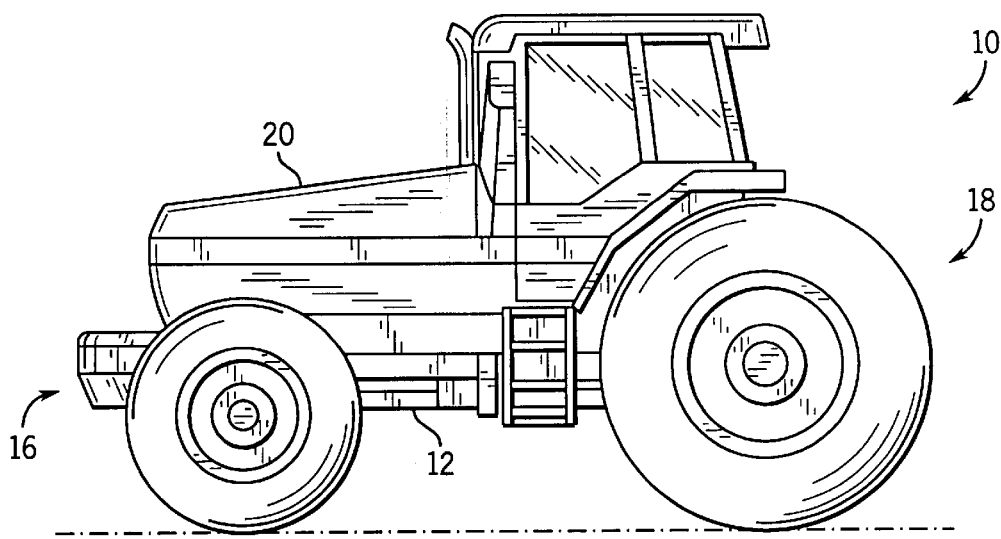
FIG. 1 is a left-side elevation of a work vehicle, shown as an agricultural tractor.

FIG. 1 shows a work vehicle, depicted as an agricultural tractor 10, including a frame 12 and a hood 20 and having a front 16 and a rear 18. Hood 20 is shown in a nominally horizontal closed position, and may be raised to at least one opened position. In a preferred embodiment, hood 20 may be raised to a first, partially opened position (e.g., approximately 40 degrees above the horizontal; see FIG. 4) and to a second, fully opened position (e.g., approximately 65 degrees above the horizontal; see FIG. 5).

The first opened position allows sufficient access to the interior of a compartment covered by hood 20 for routine maintenance activities typically performed daily; e.g., checking of fluid levels and belt tensions and cleaning convective heat transfer surfaces (e.g., engine coolant "radiators", convective oil coolers, and convective intercoolers or aftercoolers). Tractor 10, and its hood 20, is typically high enough for hood 20 to be less easily returned to a closed position by a worker from, e.g., a 65 degree opening than from a 40 degree opening. The first position of opening eases the worker's daily maintenance activity, and thereby increases the likelihood of the maintenance work being performed on a timely basis. The second opened position of hood 20 provides greater access to an engine covered by hood 20; sufficient for, e.g., replacement of a combustion air filter, and other maintenance and repair activities typically performed less frequently than daily.

Figure 2:
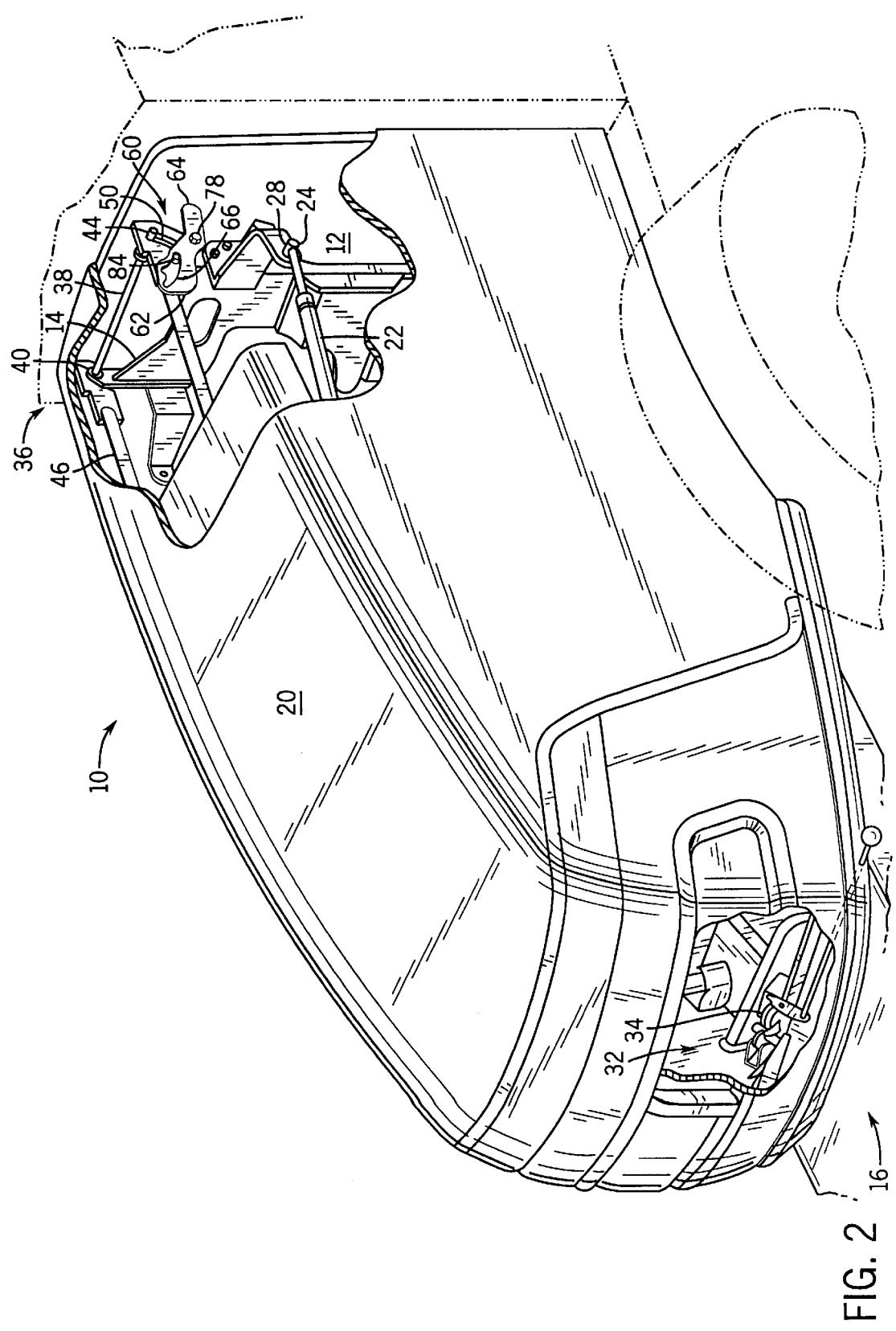
FIG. 2 is an enlarged fragmentary perspective view of an embodiment of an easy-install, two-position tractor hood.

FIG. 2 shows hood 20 and a portion of frame 12 to which hood 20 is coupled by at least one latch 32, at least one hinge 36, and a biasing device shown as a gas strut 22. In the illustrated instance, a latch 32 is located near a front end of hood 20 and a hinge 36 is located at a rear end of hood 20 so that hood 20 opens at the front and pivots at the rear. It is to be understood that, as a matter of construction rather than invention, the locations of latch 32 and hinge 36 may be altered so that hood 20 opens at the rear and pivots about the front or, similarly, opens at one side and pivots about the other side.

Latch 32 may generally be of one of the configurations of hood latch known to those skilled in the art, such latches typically including a first portion associated with a hood and a second portion associated with a frame, either of those portions engaging the other portion in a particular position when the hood is in a closed position and thereby securing the hood to the frame in the closed position. In tractor 10, latch 32 includes a guide 34 associated with the frame-associated portion of latch 32 for guiding the hood-associated portion of latch 32 into engagement with it, and in a particular position with respect to it, upon closing of hood 20.

Frame 12 includes a bracket 14 by which a hinge pin 38 is transversely mounted to frame 12. At least one hinge plate 44 engages hinge pin 38 at a hinge plate slot 50. In the illustrated instance tractor 10 includes two hinge plates 44, spaced apart from each other and located in the regions of the ends of hinge pin 38; in an alternative embodiment not shown, a hinge plate may be a single member of width substantially similar to the length of a hinge pin and may be fabricated of sheet metal in the shape of slot 50. Hinge plates 44 may be affixed to hood 20 by conventional methods known to those skilled in the art and suitable for the construction of a particular design of hood 20 (e.g., by rods 46 and brackets 48 shown in FIG. 7).

Gas strut 22 includes a first end 24 secured to frame 12 and a second end 26 (shown in FIG. 3) connected to hood 20. Gas strut 22 changes length and angle of disposition when the position of hood 20 is changed, and first end 24 and second end 26 are therefore each provided with a movable connector such as a spherical bearing 28. Gas strut 22 is configured to generate a lifting moment about a pivot axis of hood 20 which is opposite in direction and approximately equal in magnitude to a moment existing about the pivot axis due to the weight of hood 20. Gas strut 22 thereby assists in lifting hood 20 with respect to frame 12 when latch 32 is disengaged.

Tractor 10 also includes a positioning apparatus 60, discussed below, for securing the position of hood 20 in the at least one opened position. In a preferred embodiment, positioning apparatus 60 may also secure hood 20 in the second opened position. In a particularly preferred embodiment, best seen in FIGS. 2 and 3, positioning apparatus 60 further secures hood 20 in a closed position. In any preferred embodiment, positioning apparatus 60 includes a positioner plate 62 having a cam surface 66 provided with a stop position for each position of hood 20 to be secured; a cam follower 84 which engages cam surface 66; and a pivot device, shown as pivot screw 78.

Figure 3:
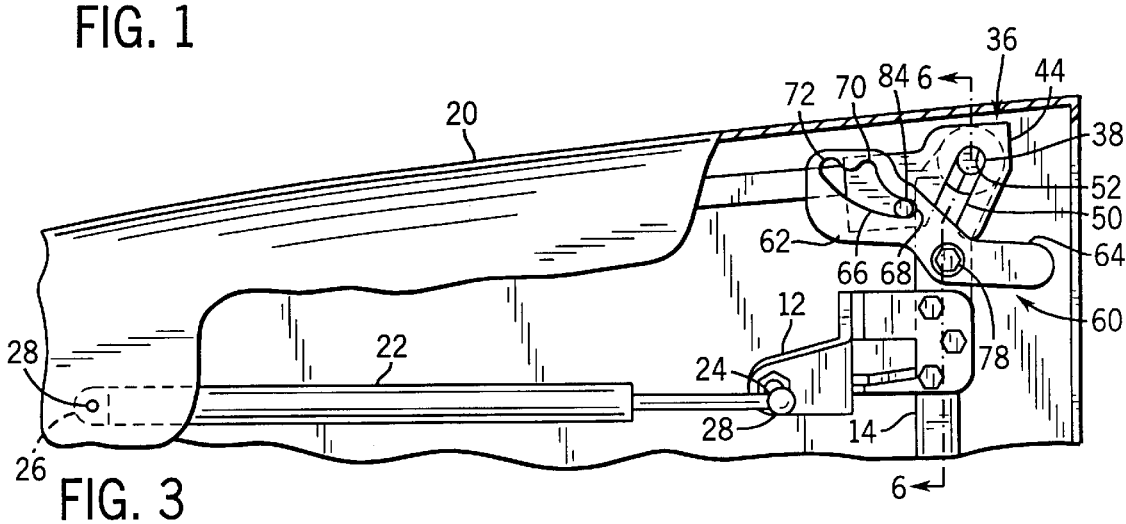
FIG. 3 is a fragmentary left-side sectional elevation of the embodiment shown in FIG. 2, wherein the hood is in a closed position.

FIG. 3 shows hood 20 in a closed position with respect to frame 12. Gas strut 22 is a compressive device (i.e., extends when free and compresses under force) and is oriented in all positions of hood 20 so that the major longitudinal axis of gas strut 22 does not pass through hinge 36. Gas strut 22 thereby generates the lifting moment described above.

Hinge slot 50 within hinge plate 44 is configured with a closed end 52 and an open end 54 (shown in FIGS. 7A, 7B, and 7C). Open end 54 of hinge slot 50 allows hood 20 to be easily installed to frame 12, by hooking hinge plate 44, and thereby hood 20 to which hinge plate 44 is affixed, over a side of hinge pin 38 which is affixed to frame 12. Hinge slot 50 is disposed at an angle between that of the line of action of gravitational acceleration upon the mass of hood 20 (i.e., downward) and that of the line of action of gas strut 22 (i.e., generally forward when hood 20 is in the closed position). The angle of disposition of hinge slot 50 is therefore both downwardly and forwardly oriented when hood 20 is in the closed position, with open end 54 of hinge slot 50 located at the most downward and forward end of hinge slot 50. Both the weight of hood 20 and the force of gas strut 22 thereby maintain hinge plates 44 engaged with hinge pin 38. Briefly referring to FIGS. 4 and 5, hinge slot 50 remains oriented with respect to the force of gas strut 22 and with respect to the acceleration of gravity such that a resultant vector force continues to maintain this engagement when hood 20 is in the first and second opened positions as well.

Returning to FIG. 3, when hood 20 is closed guide 34 causes the hood-associated portion of latch 32 (and thereby hood 20) to assume a particular position with respect to the frame-associated portion of latch 32 (and thereby with respect to frame 12). Hinge 36, provided with slotted engagements of hinge plates 44 with hinge pin 38 by virtue of hinge slots 50, changes positions of engagement of hinge plates 44 with hinge pin 38, either separately or together. Upon closure of hood 20, latch 32 then alone determines position of hood 20 and thereby of hinge plates 44 with respect to frame 12 and to hinge pin 38. Latch 32 therefore need not be aligned to hinge 36 in assembly of tractor 10 because hinge 36 is self-aligning in response to the particular position of latch 32 when closed.

Figure 6:
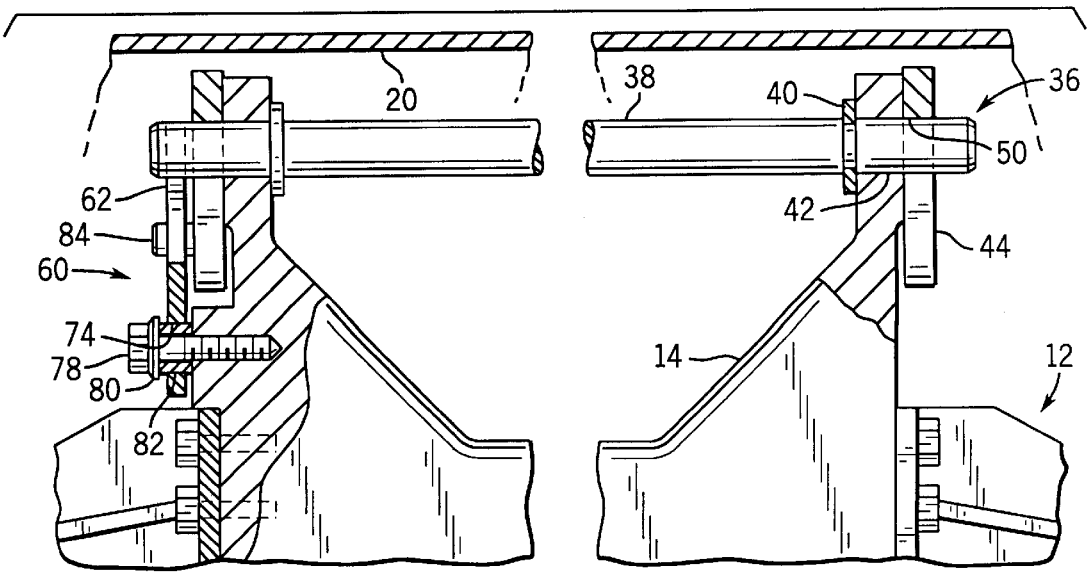
FIG. 6 is a fragmentary front sectional elevation of a portion of the embodiment shown in FIG. 2, taken at line 6—6 in FIG. 3.

Positioner plate 62 is pivotally mounted to frame 12 by a shaft, in the illustrated instance a pivot screw 78, shown more clearly in FIG. 6. Positioner plate 62 includes a configured cam surface 66. Hood 20, or an associated member which moves with hood 20 when hood 20 changes position, includes a cam follower 84, in the illustrated instance a pin affixed to hinge plate 44. As illustrated, cam follower 84 projects into and engages cam surface 66. A first end 68 of cam surface 66 is particularly located to function as a closed position stop, preventing further downward motion of hood 20 when it is at its closed position. A second end 72 of cam surface 66 is particularly located to function as a second open position stop, preventing further upward motion of hood 20 when it is at its second, or fully, open position. A recess 70, or first open position stop, is also configured to engage cam follower 84 and is located in cam surface 66 at a particular and predetermined position that, when engaged with cam follower 84, causes the engagement to define the first, or partially, open position of hood 20.

Figure 4:
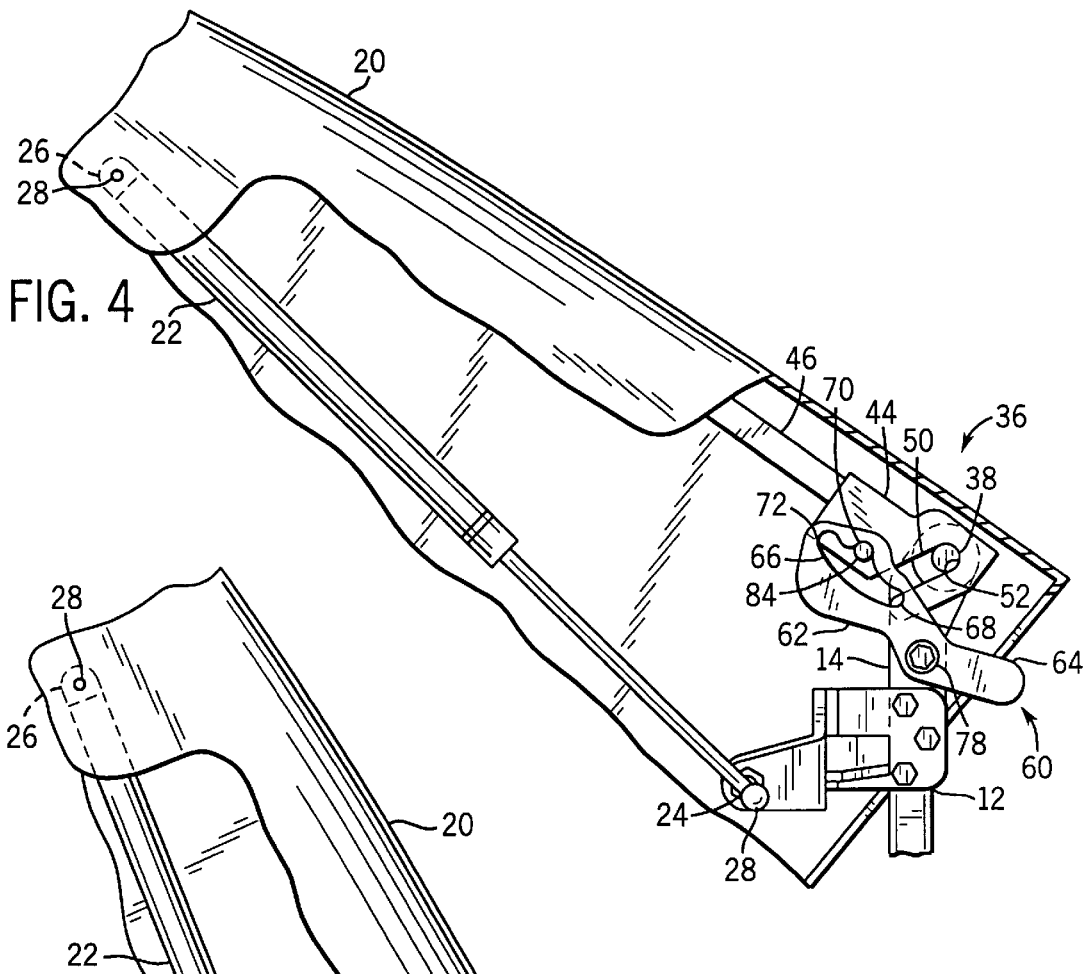
FIG. 4 is a fragmentary left-side sectional elevation of the embodiment shown in FIG. 2, wherein a hood is in a first opened position.
Figure 5:
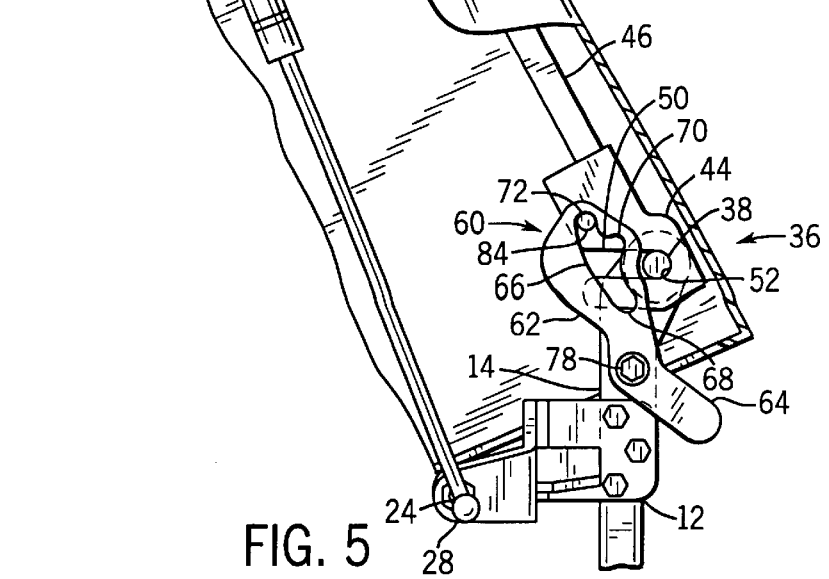
FIG. 5 is a fragmentary left-side sectional elevation of the embodiment shown in FIG. 2, wherein a hood is in a second opened position.

FIGS. 4, 5, and 6 show a portion of tractor 10 in closed and opened positions of hood 20 with respect to frame 12.

FIG. 4 shows hood 20 in its first, or partially, opened position with respect to frame 12. Comparison with FIG. 3 shows that gas strut 22 has extended, assisting in the lifting of hood 20. A vector component of force produced by gas strut 22 maintains engagement of hinge plate 44 with hinge pin 38. Cam follower 84 has moved in correspondence with hood 20, causing positioner plate 62 to pivot about pivot screw 78. Positioner plate 62 is rotationally biased in a counterclockwise direction to retain cam follower 84 engaged with the upper portion of cam surface 66, assuring engagement of cam follower 84 with recess 70. The biasing of positioner plate 62 is performed by an imbalance of weight about the pivot axis of pivot screw 78; i.e., the portion of positioner plate 62 containing cam surface 66 is made heavier than is the portion located on the other side of pivot screw 78 so that the upper portion of cam surface 66 rides upon cam follower 84. In an alternative embodiment not shown, positioner plate 62 may instead be rotationally biased by a spring (e.g., extension, leaf, or torsion).

FIG. 5 shows hood 20 in its second, or fully, opened position with respect to frame 12. Comparison with FIGS. 3 and 4 shows that gas strut 22 has extended still farther, and still maintains engagement of hinge plate 44 with hinge pin 38. Positioner plate 62 cam surface 66 second end 72 is engaged with cam follower 84, preventing hood 20 from rising farther. Referring briefly back to FIG. 4, positioner plate 62 includes a handle 64. Hood 20 may be raised from the first open position shown in FIG. 4 to the second open position shown in FIG. 5 by a worker's pressing down upon handle 64, thereby rotating positioner plate 62 and cam surface 66 clockwise far enough to disengage recess 70 of cam surface 66 from cam follower 84. Gas strut 22 begins to lift hood 20 from its first open position to its second open position, whereupon the worker may release handle 64.

Hood 20 may be returned to its closed position by pulling down upon the front of hood 20. Recess 70 may be configured to engage cam follower 84 upon lowering of hood 20 as well as upon raising, in which case a worker will have to pull down upon hood 20 while depressing handle 64 in order to reposition hood 20 from its first opened position to its closed position. In any preferred embodiment, recess 70 is configured to not fully engage cam follower 84 upon lowering of hood 20; e.g., by relieving a corner of cam surface 66 adjacent to first open position stop 68.

In an alternative embodiment, if hood 20 is to be provided only one open position a first open position stop is not needed or provided. Cam surface 66 need then not include a recess and positioner plate 62 need then be neither rotationally biased nor provided a handle.

FIG. 6 shows portions of hinge 36 and of positioning apparatus 60. In a particularly preferred embodiment, the diameter of an aperture 42 within bracket 14 of frame 12 is made slightly larger than is the diameter of hinge pin 38 so that hinge pin 38 may freely rotate within aperture 42 when engaged by hinge plate 44. Sliding contact between hinge pin 38 and slots 50 is thereby averted. Hinge 36 includes a retaining device (e.g., retaining rings 40) to retain hinge pin 38 within aperture 42. Bearings or bushings (not shown) may be provided between hinge pin 38 and the surfaces of apertures 42 to reduce friction and wear. In an alternative embodiment, hinge pin 38 is secured to aperture 42 (e.g., by interference fit, anaerobic bushing compound, welding, set screws, and the like). A retaining device (e.g., retaining rings 40) may be provided to assist in retaining hinge pin 38 within aperture 42. Hinge plate 44, and thereby hood 20, pivots about the major axis of hinge pin 38 with sliding contact between the engaging surfaces of hinge slots 50 and hinge pin 38. The width of hinge slot 50 is then made slightly larger than is the diameter of hinge pin 38, to avert a possibility of binding of hinge pin 38 within hinge slot 50.

Pivot screw 78 is shown as a shouldered cap screw with a bearing 82, which may be configured as a plastic or oil-impregnated sintered bronze bushing. Pivot screw 78 may be provided a washer 80. Pivot screw 78 extends through a clearance hole 74 in positioner plate 62, and engages a threaded pivot screw mounting hole 76 in bracket 14 of frame 12. In an alternative embodiment, positioner plate 62 may be pivoted about a shaft such as a dowel pin or spring pin (not shown) pressed into an unthreaded mounting hole within bracket 14.

FIGS. 7A through 7D show progressive stages of assembly of hood 20, gas strut 22, hinge 36, and positioning apparatus 60 to frame 12 during manufacturing of tractor 10.

FIG. 7A shows hood 20 supported by manufacturing equipment (not shown) in a position wherein hood 20 is ready for installation to frame 12. Hinge pin 38 has previously been installed to bracket 14 of frame 12. Hood 20 is tilted upwardly, in a generally opened position, so that open end 54 of hinge plate slot 50 may be slipped over hinge pin 38. Gas strut 22 and spherical bearing 28 may be preassembled to hood 20 at second end 26 of gas strut 22 as shown, but does not yet couple hood 20 to frame 12.

FIG. 7B shows hinge plate 44 (and thereby hood 20) engaged with hinge pin 38. Gas strut 22 may now be pivoted about its second end 26 spherical bearing 28 so that first end 24 spherical bearing 28 lines up with an aperture 86 in bracket 14.

FIG. 7C shows gas strut 22 installed at both its first end 24 and second end 26. Gas strut 22 now supports hood 20 in a generally open position, the position corresponding to a predetermined maximum extended length of gas strut 22. Cam follower 84 has previously been installed to hinge plate 44. Positioner plate 62, pivot screw 78, and bearing 82 are shown ready for installation to frame 12.

FIG. 7D shows hood 20 and associated components completely assembled to frame 12. Hood 20 has been pivoted downwardly about hinge pin 38 to a point at (or slightly below) its second, or fully, opened position to allow engagement of positioner plate 62 with both pivot screw 78 and cam follower 84. Positioner plate 62 has been installed to frame 12 with pivot screw 78 and bearing 82.

While the embodiments illustrated in the FIGURES and described above are presently preferred, is should be understood that these embodiments are offered only as examples. For further example, the compartment covered by the hood may be an engine or tool compartment on another type of work vehicle; e.g., a piece of construction equipment. The gas strut may be a another type of fluid cylinder or may be replaced by one or more springs; e.g., torsion springs. The rectilinear hinge slot shown may instead have the shape of a linear or nonlinear curve. A hinge pin may be associated with the frame and a hinge plate with the hood and/or a cam with the hood and a cam follower with the frame. The latch may be of conventional construction, and a separate guide pin and socket associated with the latch. The handle of the positioner plate may be replaced by a mechanical cable with an actuating knob, the cable itself spring-loaded to bias the positioner plate; or by an electromechanical actuator (e.g., a spring-loaded solenoid). Other variations of construction rather than invention will be obvious to those skilled in the art. The invention is not intended to be limited to any particular embodiment, but is intended to encompass various modifications and differences of construction that fall within the scope and spirit of the appended claims.

What is claimed is:

1. A work vehicle comprising:
   a frame provided with a compartment; and
   a hood for at least partially covering the compartment when disposed in a closed position, wherein:
   the hood is coupled to the frame by at least one hinge and at least one latch when in the closed position;
   the latch includes a stationary portion associated with one of the frame and the hood and a movable portion associated with the other of the frame and the hood;
   the hinge includes a first portion associated with the frame and a second portion associated with the hood, wherein the first portion of the hinge includes a hinge pin which is disposed transversely with respect to a longitudinal centerline of the work vehicle, and the second portion of the hinge includes a hinge plate, the hinge plate having an opening in the form of a slot, the slot disposed at an angle within the plate and extending generally downwardly and forwardly, the slot further open at an end whereby the hinge plate is configured as a hook, the slot further configured to engage the hinge pin so that the hinge pin can traverse at least a portion of the length of the slot;
   the latch is configured for the stationary portion to engage the movable portion in a particular and predetermined location with respect to the frame when the hood is disposed in the closed position; and
   the second portion of the hinge is configured to assume an approximate position with respect to the first portion of the hinge, and thereby to the frame, upon engagement of the latch;
   the latch thereby aligning the hood and the second portion of the hinge to the frame when engaged.

2. The work vehicle of claim 1, further comprising a guide for guiding the movable portion of the latch into the particular and predetermined position of engagement with the stationary portion of the latch.

3. The work vehicle of claim 1, wherein the hinge plate is:
   of a thickness which is less than the length of the hinge pin; and
   disposed perpendicular to the major axis of the hinge pin.

4. The work vehicle of claim 1, wherein the hinge pin is fixed with respect to the frame, the slot is engageable with the hinge pin over the entire length of the slot, and the hinge plate rotates upon the surface of the hinge pin.

5. The work vehicle of claim 1, wherein the hinge pin is rotatable about its major axis with respect to the frame and the hinge plate rotates about the major axis of the hinge pin.

6. The work vehicle of claim 1, further comprising a biasing device having a first end coupled to the frame and a second end coupled to the hood, the biasing device configured and disposed to:

exert a moment upon the hood about the major axis of the hinge pin substantially equal in magnitude and opposite in direction to a moment imposed about the major axis of the hinge pin by the weight of the hood, the hood being thereby positional with respect to the frame by a worker irrespective of the weight of the hood; and exert a force upon the hood disposed to urge the hinge plate into engagement with the hinge pin, the hood thereby remaining engaged with the frame in all positions of the hood with respect to the frame.

7. A work vehicle comprising:

a frame provided with a compartment;

a hood for at least partially covering the compartment and having a closed position, a first opened position, and a second opened position, the hood further having a hood pivot, the hood pivot including a hood pivot major axis about which the hood is pivoted for opening and closing of the hood, the hood pivot further including a stationary portion associated with the frame and a movable portion associated with the hood;

a biasing device having a first end coupled to the frame and a second end coupled to the hood, the biasing device configured and disposed to exert a moment upon the hood about the major axis of the hood pivot substantially equal in magnitude and opposite in direction to a moment imposed about the major axis of the hood pivot by the weight of the hood, the hood being thereby positionable with respect to the frame by a worker irrespective of the weight of the hood; and a hood positioner for controlling the amount of opening of the hood, the hood positioner including:

a cam follower affixed to one of the frame and the hood; and a cam pivotally mounted to the other of the frame and the hood by a cam pivot disposed adjacent the hood pivot, the cam pivot including a major axis which is parallel to the major axis of the hood pivot, a first end of the cam including a first stop for the cam follower and corresponding to the closed position of the hood, a second end of the cam surface including a second stop for the cam follower and corresponding to the second opened position of the hood and a third stop for the cam follower, located intermediate the first and second stops, and corresponding to the first opened position of the hood; and a biasing means for maintaining engagement of the cam follower with the cam.

8. The work vehicle of claim 7, wherein the first opened position of the hood corresponds to about forty degrees (40°) from the horizontal, and the second opened position of the hood corresponds to about sixty-five degrees (65°) from the horizontal.

9. The work vehicle of claim 7 wherein the weight of the cam is substantially balanced about the major axis of the cam pivot and the biasing means is a spring.

10. The work vehicle of claim 7 wherein the weight of the cam is imbalanced about the major axis of the cam pivot and the biasing means is the imbalance.

11. The work vehicle of claim 7 further comprising a handle associated with the cam to facilitate moving the cam in opposition to the biasing means.

12. An apparatus for the securing of a hood to a work vehicle, the hood disposable in closed and at least one opened positions with respect to a frame of the work vehicle, the hood coupled to the frame and configured for at least partially covering a compartment of the work vehicle when disposed in a closed position, the apparatus comprising:

at least one latch, the latch including a stationary portion associated with the frame and a movable portion associated with the hood, the latch configured for the stationary portion to engage the movable portion in a particular and predetermined location with respect to the frame when the hood is disposed in the closed position; and at least one hinge including a first portion associated with the frame and a second portion associated with the hood, wherein the first portion of the hinge includes a hinge pin which is disposed transversely with respect to a longitudinal centerline of the work vehicle, and the second portion of the hinge includes a hinge plate, the hinge plate having an opening in the form of a slot, the slot disposed at an angle within the plate and extending generally downwardly and forwardly, the slot further open at an end whereby the hinge plate is configured as a hook, the slot further configured to engage the hinge pin so that the hinge pin can traverse at least a portion of the length of the slot, the second portion of the hinge configured to assume an approximate position with respect to the first portion of the hinge, and thereby to the frame, upon engagement of the latch;

the latch thereby aligning the hood and the second portion of the hinge to the frame when engaged.

13. The apparatus of claim 12, further comprising a guide for guiding the movable portion of the latch into the particular position of engagement with the stationary portion of the latch.

14. The apparatus of claim 12, wherein:

the hinge plate is of a thickness which is less than the length of the hinge pin and is disposed perpendicular to the major axis of the hinge pin; and the second portion of the hinge, and thereby the hood, is slidingly engageable with the stationary portion of the hinge, and thereby with the frame.

15. The apparatus of claim 12, wherein the hinge pin is fixed with respect to the frame, the slot is engageable with the hinge pin over the entire length of the slot, and the hinge plate rotates upon the surface of the hinge pin.

16. The apparatus of claim 12, wherein the hinge pin is rotatable about its major axis with respect to the frame and the hinge plate rotates about the major axis of the hinge pin.

17. The apparatus of claim 12, comprising further a biasing device having a first end coupled to the frame and a second end coupled to the hood, the biasing device configured and disposed to:

exert a moment upon the hood about the major axis of the hinge pin, the moment substantially equal in magnitude and opposite in direction to a moment imposed about the major axis of the hinge pin by the weight of the hood, the hood being thereby repositionable with respect to the frame by a worker irrespective of the weight of the hood; and exert a force upon the hood disposed to urge the hinge plate into engagement with the hinge pin, the hood thereby remaining engaged with the frame in all positions of the hood with respect to the frame.

18. An apparatus for positioning of a hood with respect to a frame of a work vehicle, the work vehicle having a compartment, the hood configured and disposed for at least partially covering the compartment and having a closed positions first opened position and at least one second opened position, the apparatus comprising:

a hood pivot, the hood pivot including a hood pivot major axis about which the hood is pivoted for opening and closing of the hood, the hood pivot further including a stationary portion associated with the frame and a movable portion associated with the hood;

a biasing device having a first end coupled to the frame and a second end coupled to the hood, the biasing device configured and disposed to exert a moment upon the hood about the major axis of the hood pivot substantially equal in magnitude and opposite in direction to a moment imposed about the major axis of the hood pivot by the weight of the hood, the hood being thereby repositionable with respect to the frame by a worker irrespective of the weight of the hood; and a hood positioner for controlling the amount of opening of the hood, the hood positioner including:

a cam follower affixed to one of the frame and the hood, configured and disposed to engage the cam surface; and a cam pivotally mounted to the other of the frame and the hood by a cam pivot disposed adjacent the hood pivot, the cam pivot including a major axis which is parallel to the major axis of the hood pivot, a first end of the cam including a first stop for a cam follower and corresponding to the closed position of the hood, a second end of the cam surface including a second stop for the cam follower and corresponding to the at least one second opened position of the hood, and a third stop for the cam follower, located intermediate the first and second stops, and corresponding to the first opened position of the hood; and a biasing means for maintaining engagement of the cam follower with the cam surface.

19. The apparatus of claim 18, wherein the first opened position corresponds to about forty degrees (40°) from the horizontal, and the at least second opened position corresponds to about sixty-five degrees (65°) from the horizontal.

20. The apparatus of claim 18 wherein the weight of the cam is substantially balanced about the major axis of the cam pivot and the biasing means is a spring.

21. The apparatus of claim 18 wherein the weight of the cam is imbalanced about the major axis of the cam pivot and the biasing means is the imbalance.

22. The apparatus of claim 18 further comprising a handle associated with the cam to facilitate the worker moving the cam in opposition to the biasing means.

\* \* \* \* \*